United States Patent
Reibert et al.

(10) Patent No.: US 6,235,893 B1
(45) Date of Patent: May 22, 2001

(54) PROCESS FOR MAKING CELLULOSE ETHER HAVING ENHANCED GEL STRENGTH

(75) Inventors: Kenneth C. Reibert, Baton Rouge, LA (US); Jerry R. Conklin, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/283,921

(22) Filed: Apr. 1, 1999

(51) Int. Cl.[7] .................................................. C08B 11/08
(52) U.S. Cl. ........................ 536/86; 264/140; 536/99
(58) Field of Search .......................... 536/84, 90, 99, 536/86; 264/140

(56) References Cited

U.S. PATENT DOCUMENTS

| 2,160,782 | 5/1939 | Maasberg . | |
|---|---|---|---|
| 2,671,779 | * 3/1954 | Gaver et al. | 536/99 |
| 4,456,751 | 6/1984 | Messelt et al. | 536/91 |
| 4,477,657 | 10/1984 | Strange et al. | 536/91 |
| 4,661,589 | 4/1987 | Adams et al. | 536/91 |
| 5,618,800 | 4/1997 | Kabra et al. . | |

FOREIGN PATENT DOCUMENTS 1060374   7/1959   (DE) .

OTHER PUBLICATIONS

Nitis Sarkar, "Structural interpretation of the interfacial properties of aqueous solution of methylcellulose and hydroxypropyl methylcellulose," *Polymer*, vol. 25, Apr. 1984, p. 481–486.

* cited by examiner

*Primary Examiner*—Leo B. Tentoni

(57) ABSTRACT

According to the present invention, there is a methylcellulose having a methoxy substitution of about 21 to about 42 percent based upon the weight of the cellulose ether and elastic modulus (EM) of $EM \geq 181.3 \times (v^{0.2711})$ wherein "v" is viscosity of a two percent solution of the cellulose ether at 20° C. Further described is a process for making the cellulose ether, a food composition containing it, and a pharmaceutical capsule containing it.

16 Claims, 1 Drawing Sheet

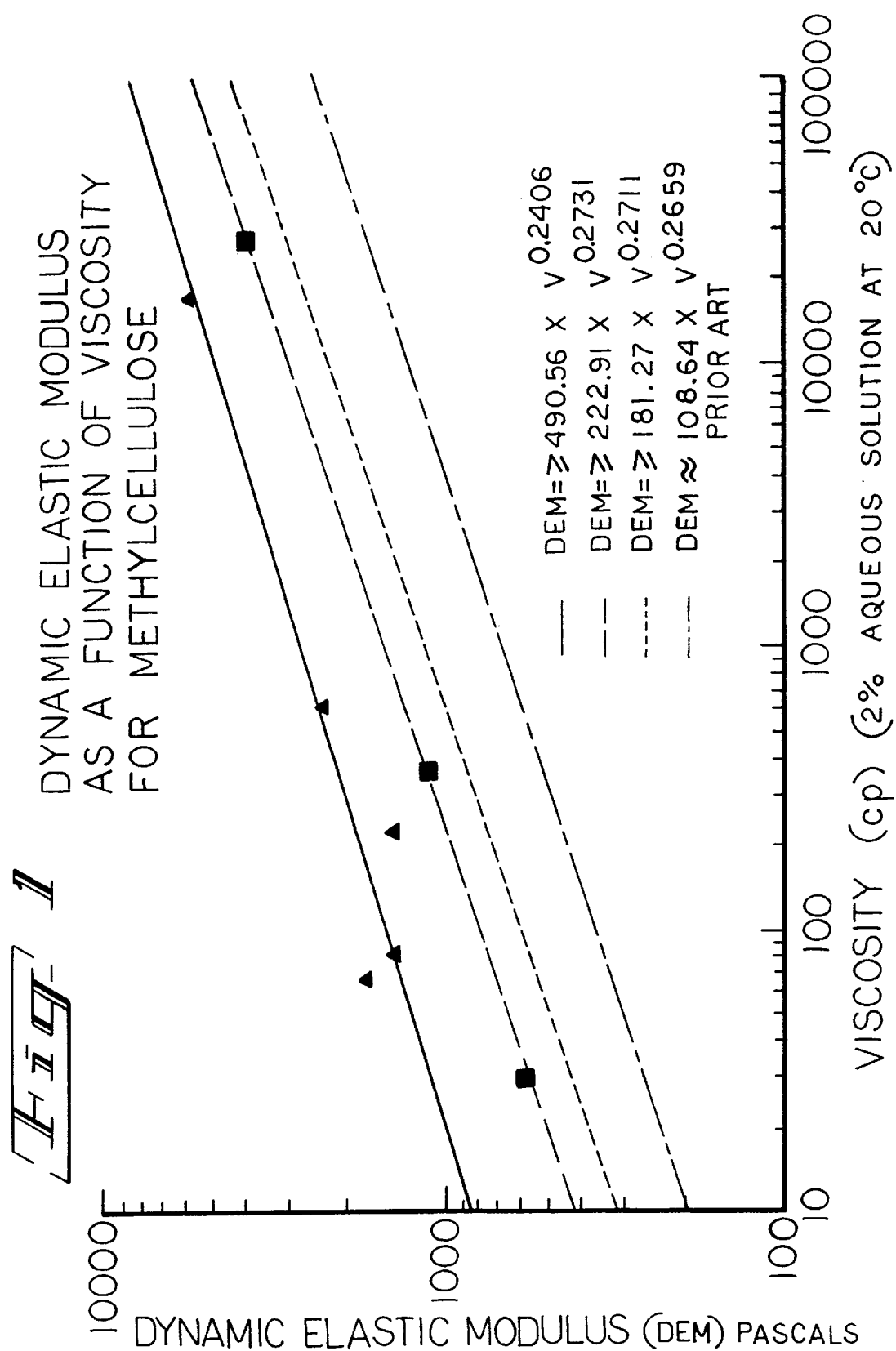

PROCESS FOR MAKING CELLULOSE ETHER HAVING ENHANCED GEL STRENGTH

FIELD OF THE INVENTION

The present invention relates to a cellulose ether having enhanced gel strength and a process for making.

BACKGROUND OF THE INVENTION

Cellulose ethers have been employed as additives to food compositions and processes to provide physical properties such as thickening, freeze/thaw stability, lubricity, moisture retention and release, film formation, texture, consistency, shape retention, emulsification, binding, suspension, and gelation.

A physical property important in some food compositions is gel strength or elastic modulus. This property relates to the strength with which a cellulose ether binds or holds food particles together. Efforts to significantly increase gel strength for conventional cellulose ethers beyond levels observed for given viscosity grades have been largely unsuccessful.

Having a cellulose ether which exhibits enhanced gel strength for given viscosity grades would enable food compositions with superior binding, consistency, and shape retention to be developed. Also, viscosity contribution and cellulose ether concentrations could be reduced in food compositions while maintaining desired gel functionality.

It would be desirable to have a cellulose ether which exhibits elevated gel strength for a given molecular weight or viscosity grade. It would also be desirable to have a process for making the cellulose ether.

SUMMARY OF THE INVENTION

According to the present invention, there is a methylcellulose having a methoxy substitution of about 25 to about 42 percent based upon the weight of the cellulose ether and a viscosity (v) to elastic modulus (EM) relationship of $EM \geq 181.3 \times (v^{0.2711})$. "$\geq$" means "greater than or equal to." Viscosity is for a 2 percent aqueous solution at 20° C. EM corresponds to gel strength.

Further according to the present invention, there is a process for making a cellulose ether. The process comprises the following: a) contacting a cellulose pulp with a first amount of aqueous alkaline hydroxide at reaction conditions sufficient to alkalize it to a first level of alkalization which is about 20 percent or more of a total level of alkalization; b) contacting the cellulose pulp of first level of alkalization with a first amount of a methylating agent at reaction conditions sufficient to form a cellulose ether having a first level of methoxy substitution which is about 20 percent or more of a total level of methoxy substitution; c) contacting the cellulose ether of first level of etherification with a second amount of aqueous alkaline hydroxide at reaction conditions sufficient to alkalize it to a second level of alkalization which is about 40 percent or more of the total level of alkalization; and d) continuously or incrementally contacting the cellulose ether of second level of alkalization with a second amount of a methylating agent over a period of time at reaction conditions sufficient to form a cellulose ether of the second level of methoxy substitution which is about 40 percent or more of the total level of methoxy substitution, the second amount of the methylating agent provides about 20 percent or more of the total level of methoxy substitution; the second amount of the methylating agent is contacted with the cellulose ether of second level of alkalization at about 65° C. to about 110° C. for 15 minutes or more.

Further according to the present invention, there is a food composition comprising a foodstuff and the present cellulose ether.

Further according to the present invention, there is a pharmaceutical capsule comprising the present cellulose ether.

DESCRIPTION OF THE DRAWING

The FIGURE is a graphical representation depicting the elastic modulus of cellulose ethers of the present invention and those of the prior art.

DETAILED DESCRIPTION OF THE INVENTION

The present invention provides novel cellulose ethers having elevated gel strength for a given viscosity grade and substitution type and level compared to that of conventional cellulose ethers. The cellulose ethers are useful in conventional cellulose ether applications, particularly in food compositions and pharmaceutical capsules.

For purposes of the present invention, a cellulose ether is a cellulose ether with a methoxy substitution of about 21 to about 42 weight percent based upon the weight of the cellulose ether. More preferred cellulose ethers have a methoxy substitution of about 21 to about 35 weight percent and most preferred cellulose ethers have a methoxy substitution of about 25 to about 35 weight percent. Methoxy substitution is determined according to ASTM D2363-72.

Cellulose ethers having viscosities of up to about 1,000,000 centipoise (cP) in a two percent aqueous solution at 20° C. can be prepared in the present invention. Preferred cellulose ethers may have viscosities of about 1 to about 600,000 cP (two percent solution). Most preferred cellulose ethers may have viscosities of about 1 to about 100,000 cP (two percent solution). Viscosities of aqueous solutions are determined by Ubbelohde tube according to ASTM D1347-72 and D2363-79.

A useful embodiment of the present cellulose ether is a methylcellulose. The methylcellulose has a non-methoxy substitution content or level of about 1 percent or less by weight and preferably about 0.2 percent or less by weight based upon the total weight of the methylcellulose and is most preferably substantially free of non-methoxy substitution content. Non-methoxy substitution includes but is not limited to hydroxyethyl, hydroxypropyl, and hydroxybutyl substitution.

The present methylcellulose can exhibit an elastic modulus (EM) in a 1.5 weight percent aqueous solution according to the following: $EM \geq 181.3 \times (v^{0.2711})$; preferably $EM \geq 222.9 \times (v^{0.2731})$; and most preferably $EM \geq 490.6 \times (v^{0.2406})$ wherein "v" is viscosity of a 2 weight percent aqueous solution at 20° C. EM corresponds to gel strength. The above relationships are depicted graphically in the FIGURE along with an analogous relationship for conventional methylcellulose. The relationship for conventional methylcellulose is representational and deemed to be an approximate average since actual viscosity to EM relationships for various conventional methycellulose specimens will vary to some degree in a range above and below the indicated approximate average. DEM in the FIGURE corresponds to EM.

EM is determined by measuring the storage modulus of a 1.5 weight percent aqueous solution of the cellulose ether in a dynamic rheometer. Techniques for measuring elastic modulus (storage modulus) are described in Kinetics of Thermal Gelation of Methylcellulose and Hydroxypropylmethylcellulose in Aqueous Solutions, Carbohydrate Polymers, volume 26, no. 3, pp. 195–203, which is incorporated herein by reference.

Cellulose ethers which can be made by the process of the present invention include but are not limited to methylcellulose (MC), hydroxypropylmethylcellulose (HPMC), hydroxyethylmethylcellulose (HEMC), and methylethylcellulose (MEC).

Another useful embodiment of the present cellulose ether is a hydroxypropylmethylcellulose (HPMC). Hydroxypropyl substitution is preferably about 32 weight percent or less, more preferably about 1 to about 14 weight percent and most preferably about 3 to about 12 weight percent based upon the total weight of the cellulose ether.

Although not bound by any theory, the enhanced physical properties of the present cellulose ethers may come from a greater degree of "blocking" or periodicity in methoxy substitution distribution in its polymeric structure than in the structure of conventional cellulose ethers. The disclosed process may induce the formation of such blocking.

The present cellulose ethers can be soluble in any of water, polar organic solvents, and mixtures thereof depending upon the type and degree of substitution of the cellulose ethers.

In addition to enhanced gel strength, preferred cellulose ethers may exhibit lower gelation temperatures than conventional cellulose ethers of equivalent viscosity and substitution. Lower gelation temperature is a desired and preferred but non-essential feature of the present invention. Reduced gelation temperature is useful in food manufacturing and processing. Food compositions can be gelled at lower temperatures saving energy and processing time during heating/cooling cycles. Further, food compositions can retain form at broader temperature ranges during processing. Gelation temperature is determined by heating a 1.5 percent by weight percent aqueous solution of the cellulose ether and observing the narrow temperature range at which gelation takes place.

Preferred cellulose ethers may also exhibit longer meltback times than conventional cellulose ethers of equivalent viscosity and substitution. Meltback time generally refers to the length of time required for a gel of a cellulose ether to melt while cooling to an ambient temperature. Preferred cellulose ether may even be stable (no meltback) at ambient temperature (72° F. (22° C.)). Longer meltback time or stability to meltback are desired and preferred but non-essential features of the present invention. Longer meltback time or stability to meltback at ambient temperature is useful in food processing and manufacturing. Gelation can be maintained over a wider temperature range and longer and better retention of texture during food processing and consumption are possible. Meltback time is determined according to the following: provide 15 grams of a 1.5 weight percent of an aqueous solution of the cellulose ether in a 20 milliliter beaker; heat the solution for 8 minutes in boiling water—the solution will gel in the beaker; invert the beaker onto a flat surface in an ambient temperature environment; allow the gel to cool and subsequently melt to form a puddle on the surface. Meltback time is measured from the time cooling begins (removal from the boiling water) to when a clear puddle forms. A gel is said to be stable to meltback if it cools to ambient temperature and resists melting for 8 hours or more.

An important aspect of the present invention is the process by which the cellulose ether is made. This process differs from that conventionally employed to make cellulose ethers. In conventional processes, cellulose pulp is completely alkalized with sodium hydroxide and etherified with methyl chloride. In the present process, cellulose pulp is partially alkalized and partially etherified with alkaline hydroxide and methyl chloride in a first stage or step and further alkalized and further etherified with additional alkaline hydroxide and methyl chloride to the desired level of completion in a later stage or stages. Methyl chloride is continuously or incrementally introduced over a period of time at certain reaction conditions in a second or later stage.

The raw material used to make the present cellulose ether is cellulose. Cellulose pulp is typically obtained from wood pulp or cotton. The pulp is preferably provided in a powder or chip form. Wood pulp is preferred.

The alkalization and etherification of the cellulose pulp is carried out in a stepwise manner in stages. A "stage" refers to a two-step reaction sequence in which an alkalization reaction and a methylation reaction take place. A stage effectively advances or increases the level of methoxy substitution of the cellulose pulp or a partially etherified cellulose ether. Optionally, other types of etherification such as hydroxypropyl substitution can be effected along with or in addition to methoxy substitution.

The cellulose pulp is alkalized in two or more stages in one or more reactors with an alkaline hydroxide, preferably sodium hydroxide. The pulp is partially alkalized in the first stage and alkalized to a desired, total level of completion in a second stage or a later stage. The pulp may be alkalized with alkaline hydroxide by any means known in the art such as steeping in a bath or stirred tank containing aqueous hydroxide or spraying aqueous hydroxide directly on dry pulp. Reaction time varies according to hydroxide concentration, temperature, and retention time. The aqueous hydroxide is preferably used at an alkaline hydroxide content of about 30 to about 70 percent by weight based upon the weight of the water. The temperature of alkylation preferably ranges from about 30° C. to about 110° C. and most preferably about 30° C. to about 90° C. Uniform swelling and alkali distribution in the pulp may be controlled by mixing and agitation. The rate of addition of aqueous alkaline hydroxide may be governed by the ability to cool the reactor during the exothermic alkalization reaction. The rate of addition of hydroxide is not critical to the present invention. If desired, an organic solvent such as dimethyl ether may be added to the reactor as a diluent and a coolant. If desired, the headspace of the reactor or reactors may be evacuated or purged with an inert gas such as nitrogen to control oxygen-catalyzed depolymerization of the cellulose ether product.

The alkylated cellulose pulp is etherified (methylated) in two or more stages in one or more reactors to form a cellulose ether. Reaction time for etherification will depend on concentration, pressure, temperature, and retention time. The primary etherifying agent is a methylating agent such as methyl chloride or dimethyl sulfate. Methyl chloride is preferred. The methylating agent may be added in a batch load at one time or continuously or incrementally over a period of time in one or more stages but must be added continuously or incrementally over a period of time in at least one stage after the first stage, preferably in the second stage. "Batch load addition" means addition substantially without pause over a relatively short period of time. "Continuous addition" means addition substantially without pause over a longer period of time. "Incremental addition"

means periodic addition of smaller, discrete amounts over a longer period of time. The alkaline hydroxide and the methylating agent may be added to the reactor at the same time but are preferably added sequentially with the alkaline hydroxide being added first and the methylating agent second.

A two-stage process is the preferred process for making the present cellulose ether. In stage one, the aqueous alkaline hydroxide and the methylating agent are reacted in sequence with a cellulose pulp to form a partially etherified cellulose ether of a first level of methoxy substitution. Each of the alkaline hydroxide and the methylating agent may be added in stage one in a batch load at one time or continuously or incrementally over a period of time. The rate of addition is not critical. The reaction temperature in the first stage is preferably controlled so that generally uniform contact and reaction can occur between the alkaline hydroxide/methylating agent and the cellulose pulp. In the second stage, additional amounts of the aqueous alkaline hydroxide and the methylating agent are reacted with the partially etherified cellulose ether to form a cellulose ether with a second level or desired, total level of methoxy substitution. The alkaline hydroxide may be added in the second stage in a batch load at one time or continuously or incrementally over a period of time. The rate of addition of hydroxide in the second stage is not critical. The methylating agent must, however, be added continuously or incrementally over a period of time in the second stage to form the present cellulose ether. The methylating agent is added in the second stage at about 65° C. to about 120° C. (temperature of contents within reactor) at 15 minutes or more; preferably at about 75° C. to about 100° C. at 20 minutes or more; and most preferably at about 80° C. to about 90° C. at 25 minutes or more. Although the methylating agent can be added continuously or incrementally over any extended period of time in the second stage, it is preferred for reasons of time economy to carry out the addition in about 120 minutes or less, more preferably in about 60 minutes or less, and most preferably in about 25 to about 45 minutes. After addition of the methylating agent in the second stage, etherification can be carried out at any temperature at which the reaction can proceed, but it is preferred for reason of time economy to carry it out at about 65° C. to about 120° C. and more preferably from about 80° C. to about 90° C. Temperature within the reactor can be determined by means such as a thermocouple which protrudes into the contents (cellulose pulp/cellulose ether mass) of the reactor. In a preferred two-stage process, both stages are carried out in the same reactor. Preferably, about 20 to about 80 percent of the total methoxy substitution is carried out in the first stage and about 80 to about 20 percent in the second stage. More preferably, about 40 to about 60 percent of the total methoxy substitution is carried out in the first stage and about 60 to about 40 percent in the second stage. Some embodiments of two-stage processes are described in Table 1.

A three-stage process is also useful for making the present cellulose ether. The first stage is carried out in a manner similar to that of the first stage in the two-stage process described above. Either or both of the second and third stages are carried out in the same manner as the second stage in the two-stage process described above (the methylating agent is added continuously or incrementally over a period of time). In a preferred three-stage process, about 20 to about 60 percent of the total methoxy substitution is carried out in each of the first and second stages and about 5 to about 30 percent in the third stage. Some embodiments of three-stage processes are described in Table 1.

It is also possible to have processes with four or more stages. The first stage of such a process would be carried out in the same manner as the first stage in the two-stage process described above. One or more of the subsequent stages would be carried out in the same manner as the second stage in the two-stage process described above (the methylating agent is added continuously or incrementally over a period of time).

TABLE 1

Some Useful Embodiments of the Process of the Present Invention

| Features | #1 | #2 | #3 | #4 | #5 | #6 | #7 | #8 |
|---|---|---|---|---|---|---|---|---|
| partial alkalization in first stage; addition of alkaline hydroxide | X | X | X | X | X | X | X | X |
| partial etherification in first stage; batch load addition of methylating agent | X | X | | | X | X | | |
| partial etherification in first stage; continuous/incremental addition of methylating agent | | | X | X | | | X | X |
| partial alkalization in second stage; addition of alkaline hydroxide | X | X | X | X | X | X | | |
| partial etherification in second stage continuous/incremental addition of methylating agent | X | X | X | X | X | X | | |
| partial etherification in second stage; batch load or continuous/incremental addition of methylating agent | | | | | | | X | X |
| partial alkalization in third stage; addition of alkaline hydroxide | | | | | X | X | X | X |
| partial etherification in third stage; continuous/incremental addition of methylating agent | | | | | | | X | X |
| partial etherification in third stage; batch load or continuous/incremental addition of methylating agent | | | | | X | X | | |
| single reactor for all stages | X | | X | | X | | X | |
| separate reactor for each stage | | X | | X | | X | | X |

Cellulose ethers such as hydroxypropylmethylcellulose, hydroxybutylmethylcellulose, methylethylcellulose and hydroxyethylmethylcellulose can be prepared by reacting the cellulose pulp or partially etherified cellulose ether with another etherifying agent in addition to the methylating agent (also an etherifying agent). Useful etherifying agents include ethyl chloride, ethylene oxide, propylene oxide, and butylene oxide. The other etherifying agent can be reacted in any stage before, during, or after reaction by the methylating agent at process conditions sufficient to effect the desired reaction. The other etherifying agent may be added to the reactor in a batch load or continuously/incrementally over a period of time. Preferably, the other etherifying agent is reacted in the first stage. Preferably, the other etherifying agent is reacted before or along with the methylating agent.

The methylating agent and any other etherifying agent may be added to a reactor in a liquid or vapor form. Liquid form is highly preferred. The reactor is preferably maintained at pressures such that the agents remain predominantly in liquid phase.

After etherification, the cellulose ether is washed to remove salt and other reaction by-products. Any solvent in which salt is soluble may be employed, but water is preferred. The cellulose ether may be washed in the reactor, but is preferably washed in a separate washer located downstream of the reactor. Before or after washing, the cellulose ether may be stripped by exposure to steam to reduce residual organic content.

The cellulose ether is dried to a reduced moisture and volatile content of preferably about 0.5 to about 10.0 weight percent water and more preferably about 0.8 to about 5.0 weight percent water and volatiles based upon the weight of cellulose ether. The reduced moisture and volatiles content enables the cellulose ether to be milled into particulate form. The cellulose ether is preferably dried at a temperature of from about 40° C. to about 80° C. Useful dryers include tray dryers, fluid bed dryers, flash dryers, agitation dryers, and tube dryers.

The cellulose ether is milled to particulates of desired size. If desired, drying and milling may be carried out simultaneously. Milling may be accomplished by any means known in the art such as a ball mill, an impact pulverizer, knife grinder, and air-swept impact mill.

The present invention distinguishes the prior art. U.S. Pat. Nos. 4,456,751; 4,477,657; and 4,661,589 relate two-stage processes for making hydroxyalkylcelluloses wherein an alkylene oxide is added continously in the first stage and another etherifying agent such as methyl chloride is added continuously in the second stage. The present process distinguishes those processes in part in that a methylating agent such as methyl chloride is added in both the first and second stages. U.S. Pat. No. 4,661,589 also relates a two stage process wherein propylene oxide and a diluent of partial methyl chloride content are added in vapor phase in a first stage and methyl chloride is added continuously in the second stage. The present process distinguishes that process in part in that the quantity of methylating agent added in the first stage is sufficient to provide a level of methoxy substitution which is about 20 percent or more of a desired, total level of methoxy substitution. The present process produces cellulose ethers having significantly greater gel strength than prior art cellulose ethers of equivalent viscosity grade and substitution. German Application 1,060,374 relates a process for making water-insoluble methylcellulose wherein methyl chloride is added in two stages. The present invention distinguishes that process in part in that a methylating agent is added continuously/incrementally in the second stage and the product cellulose ether is water soluble or swellable.

The present cellulose ether is useful in a variety of food compositions. Examples of food compositions include vegetable, meat, and soy patties; reformed seafood; reformed cheese sticks; cream soups; gravies and sauces; salad dressing; mayonnaise; onion rings; jams, jellies, and syrups; pie filling; potato products such as french fries and extruded fries; batters for fried foods, pancakes/waffles, and cakes; pet foods; beverages; frozen desserts; cultured dairy products such as ice cream, cottage cheese, yogurt, cheeses, and sour creams; cake icing and glazes; whipped topping; leavened and unleavened baked goods; and the like. In forming food compositions, the cellulose ether is typically admixed with foodstuffs during the process and formation of the compositions. The foodstuffs may be in any known form such as particle form or unitary form. Excellent teachings to the preparation of food compositions with cellulose ether and other cellulose ethers are found in the following METHOCEL® (trademark of The Dow Chemical Company) product publications: METHOCEL Premium Food Gums, Form Nos. 192-1037-87, 192-1047-87, 192-1046-87, 192-1051-87, 192-1050-87, 192-1049-87, 192-1053-87, 192-982-87, 192-979-87, 192-985-87, 192-1054-87, 192-1048-87, 192-987-87, 192-986-87, 192-989-87, 192-988-87, 192-87, 192-983-87, 192-981-87, 192-991-87, 192-980-87, 192-990-87, and 192-1052-87 (all published in 1987); Selecting METHOCEL Food Gums, Form No.192-855-1281R (published in 1981); METHOCEL Food Gums In Non-Dairy Whipped Topping, Form No. 192-877-482 (published in 1982); METHOCEL Food Gums In Fried Foods, Form Nos. 192-875-482 and 192-881-482 (all published in 1982); METHOCEL Food Gums In Salad Dressings and Sauces, Form Nos. 192-876-482, 192-880-482, and 192-905-1282 (all published in 1982); and METHOCEL Food Gums In Bakery Products, Form Nos. 192-874-482 and 192-878-482 (all published in 1982). The teachings of all the above publications are incorporated herein by reference.

Cellulose ethers particularly useful in food compositions are methylcellulose and hydroxypropylmethylcellulose. Cellulose ethers are typically used in food compositions at levels of about 0.01 to about 5 percent based upon the total weight of the food composition.

Cellulose ethers are useful in other applications such as building products, industrial products, agricultural products, personal care products, household products, and pharmaceutical products. Useful pharmaceutical applications include as capsules, encapsulants, tablet coatings, and as an excipients for medicaments and drugs. Useful excipient functions include as sustained-release and timed-release tablets. Useful building applications include drywall tape-joint compounds, mortars, grouts, cement plasters, spray plasters, cement stucco, adhesives, pastes, and wall/ceiling texturizers. Useful industrial applications include binders and processing aids for tape casting, extrusion forming, and injection molding and ceramics. Useful agricultural applications include spray adherents and suspending/dispersing aids for pesticide, herbicide, and fertilizer powders. Useful personal care and household products include shampoos, lotions, creams, and cleaning products.

The present cellulose ethers are particularly useful in compositions for pharmaceutical capsules. Capsules formed from the present cellulose ethers may exhibit substantially less distortion after drying than capsules formed from conventional cellulose ethers. Particularly useful cellulose ethers are methylcellulose and hydroxypropylmethylcellulose of low molecular weight, i.e. about 3 to about 100 cP and preferably about 3 to about 15 cP in a two percent aqueous solution. Low molecular weight cellulose ethers can be prepared directly from the process described above or can be prepared from high molecular cellulose ethers via acid-catalyzed depolymerization. Useful acids include anhydrous hydrogen chloride and hydrochloric acid. Following depolymerization to the desired degree, the acid is neutralized and the depolymerization stopped by contact with a base such as sodium bicarbonate. Useful teachings relating to making low molecular weight cellulose ethers are seen in U.S. Ser. No. 09/203,324, filed Dec. 1, 1998, which is incorporated herein by reference.

Cellulose ether capsules are typically manufactured by dipping hot pins in a cold, aqueous cellulose ether coating solution or by dipping cold pins in a hot, aqueous cellulose ether coating solution. The solutions gel on the pins and water evaporates during a drying step to form thin film layers of dried cellulose ether around the pins. The thin films take the form of caps and bodies, which are removed from the pins and mated to form capsules. Processes for making capsules are seen in U.S. Pat. Nos. 3,617,588; 4,001,211; 4,917,885; and 5,756,036, which are incorporated herein by reference.

When drying takes place non-uniformly during the manufacture of pharmaceutical capsules with conventional cellulose ethers, caps and bodies can sometimes become distorted and difficult to mate or assemble into capsules. Caps and bodies formed from the present cellulose ethers may better resist such distortion because of their enhanced gel strength.

Related application 09/283,506, filed Apr. 1, 1999 is incorporated herein by reference.

The following are examples of the present invention. Unless otherwise indicated, all percentages, parts, and proportions are by weight.

EXAMPLES

Example 1

A cellulose ether of the present invention was made with the process of the present invention.

Finely ground cellulose wood pulp was loaded into a jacketed, agitated reactor. The reactor was evacuated and purged with nitrogen to remove oxygen and then evacuated again. The reactor was used in two stages. In the first stage, 50 percent sodium hydroxide in water by weight was sprayed onto the cellulose at a weight ratio of 0.45/1.0 NaOH/cellulose and the temperature adjusted to 40° C. (starting temperature). After stirring the NaOH/cellulose for about 10–20 minutes, a mixture of dimethyl ether and methyl chloride was added to the reactor with additional methyl chloride so that the weight ratio of methyl chloride/cellulose was about 0.64/1.0. The contents of the reactor were then heated from 40° C. to 80° C. over the next 40 minutes. After reaching 80° C. (cook temperature), the first stage reaction was allowed to proceed for another 30 minutes (cook time). The second stage was effected by adding the remainder of the sodium hydroxide and methyl chloride and allowing for additional reaction. A second quantity of 50 percent NaOH in water by weight was added over 10 minutes at a weight ratio of 0.65/1.0 NaOH/cellulose (the cellulose is actually partially etherified at this point in time). A second quantity of methyl chloride was added over about 35 minutes to a level of 0.90/1.0 weight ratio of methyl chloride/cellulose. The reaction was continued at 80° C. for an additional 30 minutes (cook time) to complete the etherification. Table 2 depicts process information and data pertaining to alkalization and etherification.

After the reaction, the reactor was vented and cooled to 50° C. The contents of the reactor were removed and transferred to a tank containing hot water to form a slurry, which was subsequently agitated for 15 minutes. This slurry was pumped from the hot tank to a filter where it was de-watered and washed with hot water to remove the salt and organic by-products. The wet cellulose ether was then transferred to a dryer where moisture and volatiles content was reduced to 1 to 4 weight percent based upon the weight of the cellulose ether. The cellulose ether was then ground to a particle size of about 40 mesh (420 micrometers).

The cellulose ether product was analyzed and found to contain 31.8 percent methoxy substitution (a methoxy degree of substitution of 1.96). It exhibited a viscosity of 17,000 centipoise (cP) in a 2 percent by weight aqueous solution by weight, a gelation temperature ($T_{gel}$) of 105° F.–108° F. (40.6° C.–42.2° C.), and a elastic modulus (EM) of 5445 Pascals for a 1.5 percent by weight aqueous solution, and a meltback time of 35 minutes. EM corresponds to gel strength. These physical properties are more desirable than those of conventional cellulose ethers of similar substitution and viscosity level. Such conventional cellulose ethers typically exhibit a $T_{gel}$ of about 52°–59° C. for a 1.5 percent aqueous solution and a EM of 800–2000 Pascals for a 1.5 percent aqueous solution. Thus, the cellulose ether of the present invention has the advantages of both a significantly higher EM and a significantly lower gelation temperature compared to a conventional cellulose ether of similar substitution and viscosity grade.

In the various examples disclosed herein, EM was measured for a 1.5 percent by weight aqueous solution in a Bohlin VOR Rheometer (Bohlin Corp.) with C25 serrated bob and cup system.

Examples 1A–1D

Samples of the cellulose ether product of Example 1 were depolymerized by reaction with anhydrous hydrogen chloride for varying lengths of time followed by neutralization with sodium bicarbonate. After depolymerization, a sample exhibited a viscosity of 614 cP (two percent solution), a EM of 2250 Pascals and a meltback time of 20 minutes. After another depolymerization, a sample exhibited a viscosity of 219 cP, a EM of 1400, a $T_{gel}$ of 108° F. (42° C.), and a meltback time of 40 minutes After another depolymerization, a sample exhibited a viscosity of 81 cP, a EM of 1390 Pascals, a $T_{gel}$ of 103° F. (39° C.) and a meltback time of 19 minutes. After another depolymerization, a sample exhibited a viscosity of 66 cP, a EM of 1680 Pascals, and a meltback time of 25 minutes. Product properties are set forth in Table 4.

Example 2.

Another cellulose ether of the present invention was made with the process of the present invention. The process is as in Example 1 except where indicated otherwise in Table 2.

The cellulose ether product had a methoxy substitution of 31.3 percent and exhibited a viscosity of 26,000 cP in a 2 percent aqueous solution by weight, a $T_{gel}$ of 34.4° C., and a EM of 3740 Pascals and was stable to meltback. These physical properties compare very favorably with those of a conventional cellulose ether of similar substitution and viscosity level. Product properties are set forth in Table 3.

Examples 2A–2B

Samples of the cellulose ether end product of Example 2 were depolymerized by reaction with anhydrous hydrogen chloride for varying lengths of time followed by neutralization with sodium bicarbonate. After depolymerization, a sample exhibited a viscosity of 357 cP (2 percent solution), a EM of 1080 Pascals, and a meltback time of 50 minutes. After another depolymerization, a sample exhibited a viscosity of 29 cP, a EM of 569 Pascals, a $T_{gel}$ of 87° F. (31° C.), and a meltback time of 30 minutes. Product properties are set forth in Table 4.

Example 3

Another cellulose ether of the present invention was made with the process of the present invention. The process is as in Example 1 except where indicated otherwise in Table 2.

The cellulose ether product had a 29.9 percent methoxy substitution and exhibited a viscosity of 30,000 cP (2 percent solution), a $T_{gel}$ of 89° F. (31.7° C.), and a EM of 3200 Pascals and was stable to meltback. Product properties are set forth in Table 3.

Example 4

Another cellulose ether of the present invention was made with the process of the present invention. The process is as in Example 1 except where indicated otherwise in Table 2.

The cellulose ether product had a 32.9 percent methoxy substitution and exhibited a viscosity of 11,000 cP (2 percent solution), a $T_{gel}$ of 122° F. (50° C.), a EM of 3180 Pascals, and a meltback time of 17 minutes. Product properties are set forth in Table 3.

Example 5

Another cellulose ether of the present invention was made with the process of the present invention. The process is as in Example 1 except where indicated otherwise in Table 2.

The cellulose ether product had a 32.7 percent methoxy substitution and exhibited a viscosity of 2600 cP (2 percent solution), a $T_{gel}$ of 118° F. (48° C.), a EM of 1460 Pascals and a meltback time of 20 minutes. Product properties are set forth in Table 3.

Example 6

Another cellulose ether of the present invention was made with the process of the present invention. The process is as in Example 1 except where indicated otherwise in Table 2.

The cellulose ether product had a 26.9 percent methoxy substitution and exhibited a viscosity of 330 cP in a 2 percent aqueous solution by weight, a $T_{gel}$ of 128° F. (54° C.), a EM of 1470 Pascals and a meltback time of 8 minutes. Product properties are set forth in Table 3.

Example 7

Another cellulose ether of the present invention was made with the process of the present invention. The process is as in Example 1 except it has an additional (third) stage. Process information is set forth in Table 5.

The cellulose ether product had a 35.4 percent methoxy substitution and exhibited a viscosity of 461,000 cP (2 percent solution), a $T_{gel}$ of 45° C., and a EM of 6900 Pascals and was stable to meltback at ambient temperature. This cellulose ether product has the advantages of a significantly higher EM and a significantly lower $T_{gel}$ compared to conventional cellulose ethers of similar methoxy substitution and viscosity level. Product properties and composition are set forth in Table 6.

Example 8

Another cellulose ether of the present invention was made with the process of the present invention. The process is as in Example 1 except it has an additional (third) stage. Process information is set forth in Table 5.

The cellulose ether product had a 36.1 percent methoxy substitution and exhibited a viscosity of 26,000 cP (2 percent solution), a $T_{gel}$ of 113° F. (45° C.), a EM of 7990 Pascals, and was stable to meltback at ambient temperature. This cellulose ether product has the advantages of a significantly higher EM and a significantly lower gelation temperature compared to conventional cellulose ethers of similar methoxy substitution and viscosity level. Product properties and composition are set forth in Table 6.

Example 9

Another cellulose ether of the present invention was made with the process of the present invention. The process is as in Example 1 except it has an additional (third) stage. Process information is set forth in Table 5.

The cellulose ether product had a 34.9 percent methoxy substitution and exhibited a viscosity of 25,000 cP (2 percent solution), a $T_{gel}$ of 95° F.(35° C.), and a EM of 7565 Pascals and was stable to meltback at ambient temperature. This cellulose ether product has the advantages of a significantly higher EM and a significantly lower $T_{gel}$ compared to conventional cellulose ethers of similar methoxy substitution and viscosity level. Product properties and composition are set forth in Table 6.

While embodiments of the process and compositions of the present invention have been shown with regard to specific details, it will be appreciated that the present invention may be modified while still being fairly within the scope of the novel teachings and principles set forth herein.

TABLE 2

Process Information for Example 1–6

| | Example 1 | Example 2 | Example 3 | Example 4 | Example 5 | Example 6 |
|---|---|---|---|---|---|---|
| NaOH/Cellulose Ratio (First Stage) | 0.45 | 0.45 | 0.50 | 0.45 | 0.44 | 0.42 |
| Starting Temperature (First Stage) | 40 ° C. | 40 ° C. | 40 ° C. | 40 ° C. | 40 ° C. | 40 ° C. |
| MeCl/Cellulose Ratio (First Stage) | 0.64/1.0 | 0.64/1.0 | 0.74/1.0 | 0.64 | 0.62 | 0.60 |
| Cook Temperature (First Stage) | 80 ° C. | 80 ° C. | 80 ° C. | 80 ° C. | 80 ° C. | 80 ° C. |
| Cokk Time After Reaching Cook Temperature (Minutes) (First Stage) | 30 | 30 | 20 | 30 | 30 | 30 |
| Starting Temperature (Second Stage) | 80 ° C. | 80 ° C. | 80 ° C. | 80 ° C. | 80 ° C. | 80 ° C. |
| NaOH/Cellulose Ratio (Second Stage) | 0.65 | 0.65 | 0.40 | 0.65 | 0.65 | 0.60 |
| MeCl/Cellulose Ratio (Second Stage) | 0.90/1.0 | 0.90/1.0 | 0.61 | 0.90 | 0.90 | 0.82 |
| MeCl Feed Rate (Minutes) (Second Stage) | 30–35 | 30–35 | 30–35 | 30–35 | 30–35 | 30–35 |
| Cook Temperature (Second Stage) | 80 ° C. | 80 ° C. | 80 ° C. | 80 ° C. | 80 ° C. | 80 ° C. |
| Cook Time (Minutes) (Second Stage) | 60 | 60 | 60 | 60 | 60 | 60 |

TABLE 3

Product Properties and Composition of Example 1–6

|  | Example 1 | Example 2 | Example 3 | Example 4 | Example 5 | Example 6 |
|---|---|---|---|---|---|---|
| MeO % | 31.8 | 31.3 | 29.9 | 32.9 | 32.7 | 26.9 |
| MeO DS | 1.96 | 1.91 | 1.81 | 2.03 | 2.01 | 1.61 |
| Viscosity (cP) | 17,000 | 26,000 | 30,000 | 11,000 | 2600 | 330 |
| $T_{gel}$ | 105 °–108 ° F. (40.6 ° C.–42.2 ° C.) | 94 ° F. (34.4 ° C.) | 89 ° F. (31.7 ° C.) | 122 ° F. (50 ° C.) | 118 ° F. (48 ° C.) | 128 ° F. (54 ° C.) |
| EM (Pascals) | 5445 | 3423 | 3200 | 3180 | 1460 | 1470 |
| Meltback time (minutes) | 35 | Stable | Stable | 17 | 20 | 8 |

EM — elastic modulus in Pascals in a 1.5 percent aqueous solution; corresponds to gel strength.
Viscosity-viscosity in 2 percent aqueous solution in centipoise (cP).
MeO % — percent methoxy substitution based upon weight of cellulose ether.
MeO DS — methoxy degree of substitution.
$T_{gel}$ — gelation temperature
Stable-stable to meltback at room temperature for more than 8 hours at ambient temperature.

TABLE 4

Product Properties of Examples 1A–1D and Examples 2A–2B

|  | Ex. 1A | Ex. 1B | Ex. 1C | Ex. 1D | Ex. 2A | Ex. 2B |
|---|---|---|---|---|---|---|
| Viscosity (cP) | 614 | 219 | 81 | 66 | 357 | 29 |
| $T_{gel}$ | 111 ° F. (44 ° C.) | 108 ° F. (42 ° C.) | 103 ° F. (39 ° C.) | 102 ° F. (39 ° C.) | 96 ° F. (36 ° C.) | 87 ° F. (31 ° C.) |
| EM (Pascals) | 2250 | 1400 | 1390 | 1680 | 1080 | 569 |
| Meltback Time (Minutes) | 20 | 40 | 19 | 25 | 50 | 30 |

TABLE 5

Process Information for Example 7–9

|  | Example 7 | Example 8 | Example 9 |
|---|---|---|---|
| NaOH/Cellulose Ratio (First Stage) | 0.55 | 0.55 | 0.55 |
| Starting Temperature (First Stage) | 30 ° C. | 30 ° C. | 30 ° C. |
| MeCl/Cellulose Ratio (First Stage) | 0.71/1.0 | 0.70/1.0 | 0.70/1.0 |
| Cook Temperature (First Stage) | 80 ° C. | 75 ° C. | 75 ° C. |
| Cook Time (Minutes) (First Stage) | 60 | 60 | 60 |
| NaOH/Cellulose Ratio (Second Stage) | 1.0 | 1.0 | 1.0 |
| MeCl/Cellulose Ratio (Second Stage) | 1.3/1.0 | 1.3/1.0 | 1.30 |
| MeCl Feed Rate (Minutes) (Second Stage) | 30–35 | 30–35 | 30–35 |
| Cook Temperature (Second Stage) | 80 ° C. | 80 ° C. | 80 ° C. |
| Cook Time (Minutes) (Second Stage) | 90 | 90 | 90 |
| Venting of Reactor Headspace After Completion of Second Stage | Yes | Yes | Yes |
| NaOH/Cellulose Ratio (Third Stage) | 1.0/1.0 | 1.0/1.0 | 1.0/1.0 |
| Starting Temperature (Third Stage) | 60 ° C. | 60 ° C. | 80 ° C. |
| MeCl/Cellulose Ratio (Third Stage) | 1.4/1.0 | 1.4/1.0 | 1.4/1.0 |
| Cook Temperature (Third Stage) | 80 ° C. | 80 ° C. | 80 ° C. |
| Cook Time (Minutes) (Third Stage) | 90 | 90 | 90 |

TABLE 6

Product Properties and Compositions for Examples 7–9

|  | Example 7 | Example 8 | Example 9 |
|---|---|---|---|
| MeO % | 35.4 | 36.1 | 34.9 |
| MeO DS | 2.20 | 2.25 | 2.17 |
| Viscosity (cP) | 461,000 | 26,000 | 25,000 |
| $T_{gel}$ | 113 ° F. (45 ° C.) | 113 ° F. (45 ° C.) | 95 ° F. (35 ° C.) |
| EM (Pascals) | 6900 | 7990 | 7565 |
| Meltback time (minutes) | Stable | Stable | Stable |

EM-elastic modulus in Pascals in a 1.5 percent aqueous solution.
Viscosity-viscosity in 2 percent aqueous solution in centipoise (cP).
MeO %-percent methoxy substitution based upon weight of cellulose ether.
MeO DS-methoxy degree of substitution.
Stable-stable to meltback at room temperature for more than 8 hours at ambient temperature.

What is claimed is:

1. A process for making cellulose ether, the cellulose ether having a methoxy substitution of about 21 to about 42 weight percent based upon the weight of the cellulose ether, the process comprising:
  a) a first stage comprising
    i) contacting a cellulose pulp with a first amount of aqueous sodium hydroxide at reaction conditions sufficient to alkalize it to a first level of alkalization which is about 20 percent or more of a total level of alkalization; and
    ii) contacting the cellulose pulp of first level of alkalization with a first amount of a methylating agent at reaction conditions sufficient to form cellulose ether having a first level of methoxy substitution which is about 20 percent or more of a total level of methoxy substitution; and
  b) a second stage comprising iii) contacting the cellulose ether of first level of methoxy substitution with a second amount of aqueous sodium hydroxide at reaction conditions sufficient to alkalize it to a second level of alkalization which is about 40 percent or more of the total level of alkalization; and iv) continuously or incrementally contacting the cellulose ether of second level of alkalization with a second amount of a methylating agent over a period of time at reaction conditions sufficient to form a cellulose ether of a second level of methoxy substitution which is about 40 percent or more of the total level of methoxy substitution, the second amount of the methylating agent providing about 20 percent or more of the total level of methoxy substitution, the second amount of methylating agent being contacted with the cellulose ether of second level of alkalization at about 65° C. to about 120° C. for 15 minutes or more; and c) washing the cellulose ether of total level of methoxy substitution; and d) drying the cellulose ether of total level of methoxy substitution to a reduced moisture and volatiles content; and e) milling the cellulose ether of total level of methoxy substitution to a particulate form.

2. The process of claim 1, wherein the second level of methoxy substitution is in the cellulose ether is less than the total level, contacting the cellulose ether with an additional amount or amounts of each of aqueous sodium hydroxide and a methylating agent in sequence at reaction conditions sufficient to form the cellulose ether of the desired, total level of methoxy substitution.

3. The process of claim 1, wherein the second amount of methylating agent is added at about 75° C. to about 100° C. for 20 minutes or more.

4. The process of claim 2, wherein the second amount of methylating agent is added at about 80° C. to about 90° C. for 25 minutes or more.

5. The process of claim 3, wherein the methylation reaction is carried out at a temperature of about 65° C. to about 110° C.

6. The process of claim 1, wherein the methylation reaction is carried out at a temperature of about 80° C. to about 90° C.

7. The process of claim 1, wherein the process is a two-stage process, about 20 to about 80 percent of the total level of methoxy substitution being carried out in the first stage and about 80 to about 20 percent of the total level of methoxy substitution being carried out in the second stage.

8. The process of claim 1, wherein the process is a two-stage process, about 40 to about 60 percent of the total level of methoxy substitution being carried out in the first stage and about 60 to about 40 percent of the total level of methoxy substitution being carried out in the second stage.

9. A process for making cellulose ether, the cellulose ether having a methoxy substitution of about 21 to about 42 weight percent based upon the weight of the cellulose ether, the process comprising:

a) a first stage comprising
   i) contacting a cellulose pulp with a first amount of aqueous sodium hydroxide at reaction conditions sufficient to alkalize it to a first level of alkalization which is about 20 percent or more of a total level of alkalization; and
   ii) contacting the cellulose pulp of first level of alkalization with a first amount of a methylating agent at reaction conditions sufficient to form cellulose ether having a first level of methoxy substitution which is about 20 percent or more of a total level of methoxy substitution; and b) a second stage comprising
   iii) contacting the cellulose ether of first level of methoxy substitution with a second amount of aqueous sodium hydroxide at reaction conditions sufficient to alkalize it to a second level of alkalization which is about 40 percent or more of the total level of alkalization; and
   iv) continuously or incrementally contacting the cellulose ether of second level of alkalization with a second amount of a methylating agent over a period of time at reaction conditions sufficient to form a cellulose ether of a second level of methoxy substitution which is about 40 percent or more of the total level of methoxy substitution the second amount of the methylating agent providing about 20 percent or more of the total level of methoxy substitution, the second amount of methylating agent being contacted with the cellulose ether of second level of alkalization at about 65° C. to about 120° C. for 15 minutes or more; and a third stage comprising the following additional steps:
   v) contacting the cellulose ether of the second level of methoxy substitution with a third amount of aqueous sodium hydroxide at reaction conditions sufficient to alkalize it to a third level of alkalization;
   vi) contacting the cellulose ether of the third level of alkalization with a third amount of methyl chloride at reaction conditions sufficient to form a cellulose ether having the desired, total level of methoxy substitution;

c) washing the cellulose ether of total level of methoxy substitution; and d) drying the cellulose ether of total level of methoxy substitution to a reduced moisture and volatiles content; and e) milling the cellulose ether of total level of methoxy substitution to a particulate form.

10. The process of claim 9, wherein about 20 to about 60 percent of the total level of methoxy substitution is effected in each of the first and second stages and about 5 to about 30 percent in the third stage.

11. The process of claim 1, wherein the cellulose ether has a methoxy substitution of about 21 to about 35 weight percent.

12. The process ether of claim 1, wherein the cellulose ether has a methoxy substitution of about 25 to about 35 weight percent.

13. The process of claim 1, wherein the cellulose pulp or the cellulose ether is contacted with propylene oxide in the first or the second stage in addition to the contact with the methylating agent at reaction conditions sufficient to form a cellulose ether having a methoxy substitution of about 21 to about 42 weight percent, based upon the weight of the cellulose ether, and having hydroxypropyl substitution.

14. The process of claim 1, wherein the cellulose pulp or the cellulose ether is contacted with butylene oxide in the first or the second stage in addition to the contact with the methylating agent at reaction conditions sufficient to form a cellulose ether having a methoxy substitution of about 21 to about 42 weight percent, based upon the weight of the cellulose ether, and having hydroxybutyl substitution.

15. The process of claim 1, wherein the cellulose pulp or the cellulose ether is contacted with ethylene oxide in the first or the second stage in addition to the contact with the methylating agent at reaction conditions sufficient to form a cellulose ether having a methoxy substitution of about 21 to about 42 weight percent, based upon the weight of the cellulose ether, and having hydroxyethyl substitution.

16. The process of claim 1, wherein the cellulose pulp or the cellulose ether is contacted with ethyl chloride in the first or the second stage in addition to the contact with the methylating agent at reaction conditions sufficient to form a cellulose ether having a methoxy substitution of about 21 to about 42 weight percent, based upon the weight of the cellulose ether, and having ethoxy substitution.

* * * * *